June 18, 1957   J. H. DAHLBERG   2,795,817
PROCESS FOR EVISCERATING POULTRY
Filed Aug. 24, 1953
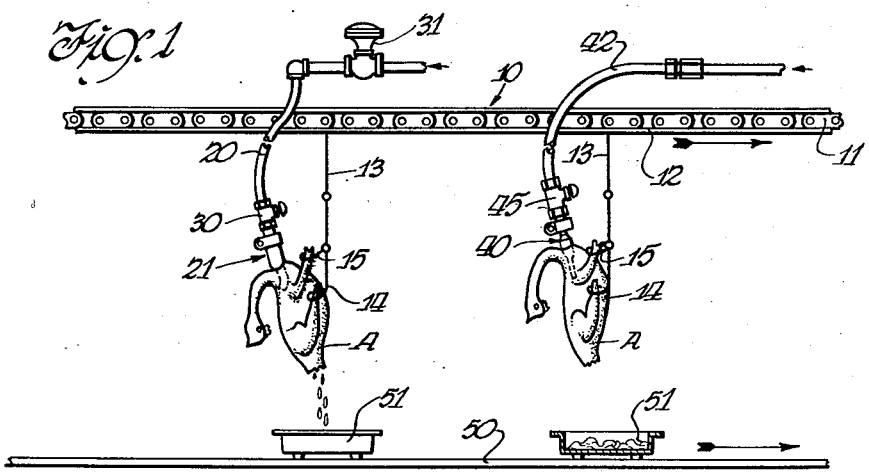
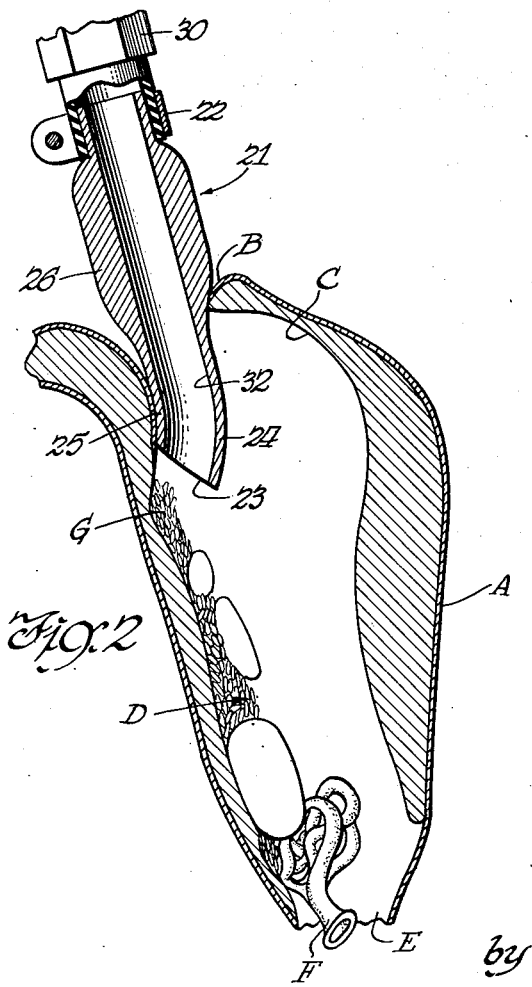
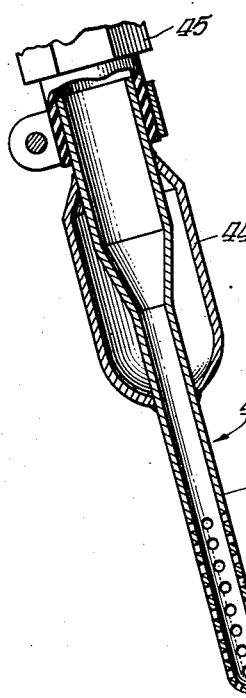
Inventor
J. Herman Dahlberg
by Fidler, Cromer & Beardsley
Attys.

United States Patent Office 2,795,817
Patented June 18, 1957

2,795,817

PROCESS FOR EVISCERATING POULTRY

John Herman Dahlberg, Omaha, Nebr., assignor to C. A. Swanson & Sons, Omaha, Nebr., a corporation of Nebraska Application August 24, 1953, Serial No. 376,050

6 Claims. (Cl. 17—45)

This invention relates to the evisceration of poultry and has to do with a process for removing the viscera from the visceral cavity and to apparatus adapted for carrying out such process.

In the processing of poultry it has been customary to subject the fowl, after killing, to a defeathering operation. Thereafter the vent is cut away from the adjoining skin and the abdominal skin slit between the vent cut and the keel bone in order to provide access to the visceral cavity. The poultry is further prepared by cutting the skin between the head and body longitudinally along the lower side of the neck from approximately the craw to the juncture of the lower portion of the neck with the breast. The preparation for evisceration is completed by slitting the skin transversely at the juncture of the neck and the breast at a point underneath the neck and the beginning of the breast bone and severing the esophagus. Heretofore, the viscera have been removed by a manual operation consisting of inserting the hand of the operator into the visceral cavity and pulling the viscera loose from the carcass and removing them through the rear opening. This manual removal is a relatively time-consuming operation and requires a skilled operator for satisfactory results. Also, in many cases the viscera and particularly such organs as the lungs are not completely removed thereby.

An object of the present invention is to provide an improved process for removing the viscera from a fowl carcass.

Another object is to provide a process for removing the viscera from a fowl carcass whereby the viscera are completely removed and the visceral cavity is thoroughly cleansed.

A further object is to provide a process for removing the viscera from a fowl carcass which is simple, rapid, fully effective and can be performed by a relatively inexperienced operator.

A further object is to provide a process for removing the viscera from a fowl carcass whereby the viscera may be removed quickly and completely and without damage to any of the viscera.

A further object is to provide a process for removing the viscera from a fowl carcass wherein a fluid under pressure is introduced into a fowl carcass in such manner as to completely detach the viscera from the walls of the visceral cavity and expel all of the viscera from the cavity.

A further object is to provide novel apparatus for mechanically removing the viscera from a fowl carcass.

A still further object is to provide apparatus for mechanically removing the viscera from a fowl carcass and effectively cleansing the visceral cavity from which the viscera had been removed.

A further object is to provide apparatus for automatically removing the viscera from a fowl carcass.

Other objects and advantages of the invention will appear from the following description taken in connection with the appended drawings wherein:

Fig. 1 is a somewhat diagrammatic view of the apparatus constructed in accordance with the invention;

Fig. 2 is an enlarged fragmentary, sectional view showing a portion of the apparatus and its relation to the fowl carcass being eviscerated; and Fig. 3 is an enlarged fragmentary, sectional view showing another portion of the apparatus of Fig. 1.

In accordance with the present invention the fowl carcass is prepared for evisceration in a manner similar to that heretofore employed in connection with the manual removal of the viscera, the carcass thereby being provided with front and rear openings as above mentioned. The fowl carcass is then suitably held, for example, by suspending it from a shackle in a position with the rear opening downward. Fluid is introduced into the visceral cavity through the front opening and under sufficient pressure to detach the viscera from the visceral cavity and expel them through the rear opening. In order to insure that the visceral contents are discharged through the rear opening and that none pass out through the front opening, the latter is suitably closed as hereinafter explained.

The fluid employed for expelling the visceral contents preferably is air although a liquid such as water may be employed. Preferably air under pressure is first employed to disengage the visceral contents and expel them from the visceral cavity, whereafter water under pressure is introduced into the visceral cavity in order to remove any adherent portions of the viscera and to wash the interior walls of the visceral cavity.

The fluid is introduced in the form of a controlled jet which is directed so as to impinge principally against the back wall of the visceral cavity whereby it detaches the viscera from the back wall and particularly the lungs which are so attached to the rib area at the back as to be rather securely held against detachment.

I have found that it is important that the pressure of the fluid introduced into the visceral cavity be carefully controlled in order that the desired results be obtained. If the pressure is too low the fluid will not satisfactorily detach the fibrous connections between the viscera and the walls of the visceral cavity and remove the viscera from the cavity. Such an inadequate pressure merely tends to create a ballooning effect in the visceral cavity. On the other hand, if the pressure of the fluid is too great the fluid will tend to break up and in some cases even injure portions of the viscera and particularly the liver. This is especially true in connection with young poultry where the liver is of tender composition and can be readily bruised.

Preferably, in accordance with the present process, the visceral contents are discharged onto suitable receiving means for inspection thereof.

As above stated, the fowl is prepared for evisceration in a manner similar to that heretofore employed where the viscera is removed manually. After the polutry has been killed it is scalded and the feathers removed. This provides in the fowl carcass A (as shown in Fig. 2) a front opening B into the cavity C containing the viscera D and a rear opening E around the vent F, the latter being entirely severed from the adjacent skin.

The process preferably is carried out by advancing the fowl carcass successively past an eviscerating station where the eviscerating operation is carried out. To this end, I provide a suitable conveyor 10 preferably comprising spaced endless chains 11 (one of which is shown) each positively supported and guided by a guide member 12, the chains being driven in unison by suitable means (not shown). Each fowl carcass is suspended from the conveyor by a suitable shackle 13 having portions 14 for engaging the legs and portions 15 for engaging the wings, the shackle being arranged to support the fowl in a generally upright position as illustrated somewhat diagrammatically in Fig. 1. The shackles 13 preferably are rigidly held by suitable means (not shown) to prevent the fowl carcass from swinging freely.

Located at the eviscerating station is a flexible conduit 20 connected to a source (not shown) of fluid under pressure which preferably is air. The conduit may be formed of any suitable flexible material such as rubber, plastic or other material. Attached to the free end of the conduit is a non-flexible continuation which takes the form of a nozzle 21 formed of a suitable rigid material such as metal, rubber or a plastic and which is attached in a suitable manner as by clamp 22 to the conduit. The terminal end or outer of the nozzle serves both as a conduit and a probe adapted to enter the front opening B in the fowl carcass A (Fig. 2). The forward end is provided with an inclined end opening or orifice 23 formed by extending one wall portion 24 of the nozzle 21 beyond the opposite wall portion 25 and preferably the extended wall is arcuate in form.

This information of the nozzle causes the jet of fluid to pass from the nozzle principally in a direction inclined from the principal axis of the nozzle, whereby when the nozzle is inserted in the fowl cavity through the front opening with the extended wall 24 toward the breast of the fowl the jet of fluid is directed toward the back wall of the visceral cavity and will impinge initially principally against the lung area G, thereby causing the maximum amount of pressure to be exerted against the lung area and pull the lungs away from the wall to which they adhere prior to the remainder of the viscera being affected by the pressure of the fluid. It is important that the lungs be separated from the visceral wall prior to the separation from the balance of the viscera in order to insure that the lungs will not remain in the visceral cavity which would require an additional operation in order to remove them.

The lungs of poultry are attached by fibre strings to the rib section of the back of the poultry, that is, they are attached at the top of the visceral cavity to the rib area at the back of the poultry in such manner as to be rather securely formed into the back area. The location of the lung area from the point of junction of the neck to the back of the poultry is approximately the same with respect to each type or class of poultry but, of course, the age and type of poultry regulates the size of the fowl and when large fowl are eviscerated the length of the nozzle, through which the air is discharged, and more particularly the length of the reduced forward end of the nozzle, will therefore vary somewhat with the size of fowl being eviscerated.

The nozzle rearwardly of the forward portion is formed with an enlargement 26 which may be provided by thickening the wall of the nozzle at that portion. This enlargement serves to close the front opening when the nozzle is inserted therein so that the fluid discharged into the visceral cavity is forced against the viscera and out through the rear opening along the viscera and is not discharged through the front opening. In this connection it is preferable that the nozzle be provided with a smoothly tapered exterior contour from the forward smaller diameter portion to the rearward enlarged portion in order to permit easy insertion into the front opening without damaging the fowl and to provide an adequate closure of the front opening. The enlargement may extend rearwardly a substantial distance and thus provide a convenient handle or gripping portion for the operator where the operation is performed manually.

Means are provided preferably for permitting the control of the discharge of fluid from the nozzle as it is preferable that the fluid be discharged only after the nozzle has been inserted into the visceral cavity. To this end, a valve is provided in the fluid line whereby discharge of fluid may be controlled either manually or automatically. The valve conveniently may be a manually operated valve 30 of suitable construction which is provided in the conduit at a position convenient for manual operation and preferably adjacent the rear end of the nozzle. Alternatively, the valve may be incorporated in the nozzle itself. As above noted, it is important that the pressure of the fluid be controlled in order to provide the most effective operation and to prevent damage to the fowl. While the pressure may be controlled manually by suitable manipulation of the control valve 30, in cases where the source of pressure may not be uniform I prefer to insert in the fluid line an automatic pressure control means 31 of known construction.

The pressure employed should of course be sufficient to fully remove the viscera but not so great as to injure the more delicate parts of the viscera such as the liver. Where young poultry is to be eviscerated less pressure can be used than in the case of older fowl. In the case of young poultry a pressure of 120 pounds per square inch has been found sufficient to provide excellent results, but in the case of older poultry a pressure of 150 pounds per square inch or more is required. I have found that a pressure of approximately 150 pounds per square inch will provide desirable results in the case of most chickens, but where old fowl and tougher varieties of fowl are to be eviscerated a greater pressure should be employed, especially poultry with considerable fat surrounding the visceral contents, as the fat tends to hold more firm the visceral organs and makes eviscerating more difficult, and up to about 175 to 180 pounds per square inch may be used.

I have found that it is desirable that the inside dimension of the nozzle orifice 23 be of a diameter between approximately ¾ inch and 1½ inches in order to provide the desired results; a diameter of approximately 1 inch has been found to be entirely satisfactory for use in connection with most chickens. Preferably the diameter of the passage 32 in the nozzle is the same as the diameter of the orifice 23. It is desirable to use a nozzle having as large an orifice as practicable in order that the unit pressure of the fluid against the viscera be relatively low but the fluid of course must apply a sufficient total force to detach the viscera from the walls of the viscereal cavity and expel them through the rear opening E. Accordingly, it is desirable to provide a nozzle having an orifice not substantially less than ¾ inch in diameter. On the other hand, there is a maximum size of nozzle which can be used since the front opening between the neck and breast bone can only be made so large dependent upon the particular size of the poultry carcass. Where the apparatus of the present invention is to be used for eviscerating large fowls such as turkeys the nozzle may be made of sufficient size to provide an orifice of approximately two inches in diameter.

The walls at the forward portion of the nozzles are made of sufficient thickness to insure the desired strength and rigidity and the outside diameter of the nozzle at this portion exceeds the inside diameter by an amount twice the wall thickness and the nozzle may have an outside diameter at this portion of about 1 inch or more for a nozzle having a ¾ inch orifice to about 1¾ inches or more for a nozzle having 1½ inch diameter orifice. The enlarged rearward portion of the nozzle is of sufficient diameter to insure the closing or plugging of the front opening in the fowl carcass, and in the case of a nozzle having a ¾ inch diameter orifice to be used with a chicken it should be at least 1½ inches in external diameter. In the case of a nozzle having a larger diameter the rearward portion is made correspondingly larger.

As stated above, I have found it desirable to wash or flush out the visceral cavity after removal of the viscera in order to insure that all of the visceral contents are removed and the walls of the visceral cavity are completely cleaned. To this end, I introduce into the cavity water under pressure and preferably in the form of a plurality of jets so as to bring the water into contact with all portions of the walls of the visceral cavity. The water should be discharged into the cavity under sufficient pressure to thoroughly flush all portions of the wall.

I provide a water nozzle 40, one embodiment of which is illustrated in Fig. 3, to which reference is now made. The nozzle 40 includes a forward portion 41 connected to a conduit 42 which in turn is connected to a source (not shown) of water under pressure. The conduit 42 may be similar in diameter to the conduit 20 employed for providing air under pressure or may be somewhat smaller and the forward end of the nozzle may be substantially the diameter of the forward portion of the nozzle 21, although preferably it is somewhat smaller in diameter for purposes which will hereinafter appear. The forward end 41 is provided throughout a substantial portion of its length with a plurality of small orifices 43 through which the water may be projected both in a generally axial or forward direction and also laterally. The openings 43 are of such size and so closely spaced as to provide a plurality of closely adjacent jets which, when the nozzle 40 is inserted in the visceral cavity, are adapted to impinge against substantial areas of the walls of the visceral cavity. The nozzle 40 need not extend throughout the visceral cavity as the walls in the rearward portion of the visceral cavity will be thoroughly flushed by the jets projected forwardly and by the water which has been projected into the cavity at the upper portion thereof and which flows downwardly along the walls of the cavity.

The nozzle 40 is provided with an enlargement 44 adapted to close the forward opening B in a manner analogous to the manner in which the opening is closed by the enlargement 26 and the air nozzle 21 as above described. Thus water is prevented from passing out of the visceral cavity through the front opening.

The water conduit may be provided with valve means for controlling the flow of the water from the nozzle and such valve 45 preferably is provided in the conduit 42 adjacent the nozzle 40 or is provided in the nozzle itself whereby the operator may open the valve after the nozzle has been inserted in the fowl carcass and close it before the nozzle is removed from the carcass.

The water nozzle and connections preferably are located at the eviscerating station and just beyond the air nozzle so that the water may be introduced into the fowl carcass after the viscera has been removed by the air.

Means are provided for receiving the viscera expelled from the fowl carcass and preferably takes the form of an endless traveling conveyor 50 disposed under the conveyor 10 and carrying a plurality of inspection pans 51 disposed one under each shackle in position to receive the expelled viscera. Thus the viscera may be inspected as they are advanced by the conveyor 50 and the pans removed from the conveyor and the viscera processed in the usual manner.

The process in accordance with the present invention lends itself to a fully automatic removal of the visceral contents and the nozzle or nozzles above described may be employed. However, in mechanisms for performing the process automatically the shackles 13 are held rigid by automatic means (not shown) while passing by the eviscerating station and the nozzle or nozzles are inserted into the top opening by automatic means (not shown) and are removed by such means after the fluid is discharged into the visceral cavity. The air valve and the water valve are actuated automatically by suitable means (not shown) in timed relation with the movement of the shackles past the eviscerating station.

The present invention has been described in connection with its application to the evisceration of poultry and it will be understood that it is applicable to various other species of the fowl family. It is also applicable to the whole evisceration of animals such as hogs, sheep and cattle. In its application to animals the animal carcass is provided with front and rear openings leading into the visceral cavity at points corresponding generally to those in which the openings are formed in the fowl carcass so as to permit the introduction of fluid under pressure at one end of the cavity and the expulsion of the visceral contents at the other end of the cavity.

The process also is applicable to the evisceration of fish. In such process, an outlet opening is made in the fish at approximately the bung area. The fluid under pressure is introduced through the mouth of the fish, as by inserting the nozzle in the mouth, and the viscera are expelled through the outlet opening.

I claim:

1. In the method of eviscerating a poultry carcass wherein a first opening has been made adjacent the juncture of the neck and breast and a second opening adjacent the vent and the alimentary tract has been severed from the adjacent carcass portions at the lower end of the esophagus and at the vent, the step which comprises introducing air under pressure of from approximately 120 pounds per square inch to approximately 180 pounds per square inch into the visceral cavity through the first opening in a direction to detach the viscera from the walls of the cavity solely by said fluid pressure and to expel the viscera through the second opening.

2. In the method of eviscerating a poultry carcass wherein a first opening has been made adjacent the juncture of the neck and breast and a second opening adjacent the vent and the alimentary tract has been severed from the adjacent carcass portions at the lower end of the esophagus and at the vent, the steps which comprise introducing air under pressure into the visceral cavity through the first opening in a direction and under sufficient pressure to detach the viscera from the walls of the cavity solely by said fluid pressure to expel the viscera through the second opening and thereafter introducing a liquid under pressure into the visceral cavity through said first opening and against the walls of said cavity to wash said walls and remove adherent visceral material.

3. The method of eviscerating poultry which comprises severing the vent from the surrounding skin and cutting at least a portion of the abdominal skin from the vent to the keel bone to detach the vent and provide a rear opening leading from the visceral cavity, providing a front opening into the visceral cavity adjacent the juncture of the neck and the breast, severing the esophagus, and then introducing into the visceral cavity through said front opening a fluid under sufficient pressure to detach the viscera from the walls of the cavity solely by said fluid pressure and in a direction to expel the viscera through said rear opening.

4. The method of eviscerating poultry which comprises severing the vent from the surrounding skin and cutting at least at portion of the abdominal skin from the vent to the keel bone to detach the vent and provide a rear opening leading from the visceral cavity, providing a front opening into the visceral cavity adjacent the juncture of the neck and the breast, severing the esophagus, then introducing into the visceral cavity through said front opening a fluid under sufficient pressure to detach the viscera from the walls of the cavity solely by said fluid pressure and in a direction to expel the viscera through said rear opening, then introducing water under pressure into the visceral cavity through said front opening and projecting it against the walls of said cavity to wash away adherent visceral material.

5. The method of eviscerating poultry which comprises severing the vent from the surrounding skin and cutting at least a portion of the abdominal skin from the vent to the keel bone to detach the vent and provide a rear opening leading from the visceral cavity, providing a front opening into the visceral cavity adjacent the juncture of the neck and the breast, severing the esophagus, and then introducing into the visceral cavity through said front opening a fluid under sufficient pressure to detach the viscera from the walls of the cavity solely by said fluid pressure and in a direction to expel the viscera through said rear opening, while maintaining said front opening otherwise closed to prevent the passage of fluid or visceral contents outwardly through said front opening.

6. The method of eviscerating poultry which comprises severing the vent from the surrounding skin and cutting at least a portion of the abdominal skin from the vent to the keel bone to detach the vent and provide a rear opening leading from the visceral cavity, providing a front opening into the visceral cavity adjacent the juncture of the neck and the breast, severing the esophagus, and then introducing into the visceral cavity through said front opening a fluid under sufficient pressure and in a direction principally against the back wall of said cavity and toward the rear opening to detach the viscera from the walls of the cavity solely by said fluid pressure and expel the viscera through said rear opening.

References Cited in the file of this patent

UNITED STATES PATENTS

| | | |
|---|---|---|
| 1,385,951 | Range | July 26, 1921 |
| 1,433,628 | Knaust | Oct. 31, 1922 |
| 2,327,224 | Spang | Aug. 17, 1943 |
| 2,370,947 | Funkey | Mar. 6, 1945 |
| 2,423,299 | Davis | July 1, 1947 |
| 2,427,840 | Davis | Sept. 23, 1947 |
| 2,613,391 | Still | Oct. 14, 1952 |
| 2,723,421 | Smith et al. | Nov. 15, 1955 |